Patented Nov. 9, 1943

2,333,816

UNITED STATES PATENT OFFICE 2,333,816

PROCESS FOR THE MANUFACTURE OF MOLDED ARTICLES FROM ARTIFICIAL MASSES

Hans Pohle, Cologne-Mulheim, and Paul Weikart, Rath-Konigsforst, near Cologne, Germany, assignors to Winthrop Chemical Company, Inc., New York, N. Y., a corporation of New York No Drawing. Application December 24, 1938, Serial No. 247,684. In Germany December 27, 1937

8 Claims. (Cl. 18—55)

The present invention relates to a process for the manufacture of molded articles from artificial masses.

For the manufacture of molded articles from artificial masses, besides the casting process, especially for prosthetic work in dentistry, the pressing of blanks or powders from artificial masses under heat and pressure has been used. The last mentioned process involves the disadvantage that special presses and high pressures are necessary in order to obtain an exact reproduction of the model. Therefore, it has already been proposed in case of prosthetic work in dentistry to mix a powdered polymeric artificial mass with a liquid monomer, to introduce the paste into a mold and to polymerize it by heating.

It has now been found that molded articles, especially dentures from thermoplastic artificial masses, can be prepared by heating a preferably aqueous paste of such artificial masses which are substantially free from polymerizable material in a mold at least up to the softening point even without using high mechanical pressure.

For the present process the usual thermoplastic artificial masses are suited; preferably emulsion polymerizates, such as polyvinyl chloride, which may be subsequently chlorinated, polyvinyl acetate, mixed polymerizates of vinyl chloride and vinyl- or acrylic acid esters, such as vinyl acetate or acrylic acid methyl ester, polystyrene, polymerized methacrylic acid esters, polyvinyl carbazole or chlorinated rubber, acetylcellulose and above all benzylcellulose, alone or admixed with one another.

The size of the particles of the artificial masses in the pastes ranges from about 50 to about 500μ, and preferably is between 100 and 200μ. Formation of the paste is suitably carried out with water to which glycerine, wetting and fillinging agents, pigments or softeners may be added. In order to accelerate the evaporation of water from the paste there may be added highly volatile agents, such as ethanol, methanol, acetic ester or acetone. Preferably such highly volatile substances may be added which have no dissolving effect upon the artificial substances, but only cause a swelling thereof.

The water content of the paste is advantageously so chosen that the same shows a nearly cement-like consistency. If possible the paste shall not be fluid, but should be capable of being cut and easily applied by means of a spatula. Depending on the artificial mass and the fineness of the material used the most favorable water content of the paste varies. When using benzylcellulose it should not amount to more than about 50 to 60 per cent, preferably from 30 to about 40 per cent. Good results may even be obtained when the water content is as low as the paste of about 15 per cent.

The paste is suitably introduced in excess into the mold, as by means of a spatula, and is at first heated to such a degree that the mold can be closed, under which conditions the form is completely filled. Subsequently, it is suitably heated in a vapor atmosphere, preferably in an autoclave of the type usually used for dental rubbers. The heating temperature is advantageously adapted to the softening temperature of the artificial mass used and may amount to 135 to 140° C. in the case of benzylcellulose. Advantageously it is not very much above the softening point of the artificial mass. It lies in general between 120 and 160° C.

It is recommended that after having filled the paste into the mold a material capable of absorbing water, for instance a dry flap, is introduced between the mold wall and the paste; then the mold is shut and opened again after a short time. By this process excess water which may be present is absorbed by the flap. Eventually any shortage of material may be supplied or any excess may be removed, to ensure a completely filled mold.

The mold may be either cold or heated during use. With the larger sizes of molds it is preferred first to heat the filled mold, for instance to 100° C., preferably in a water bath, and then to subject it to final heating in an autoclave.

The end products correspond to the normal vulcanizates of dental hard rubber as regards their hardness, but with regard to their elasticity they are far superior. From a chemical point of view they do not differ from molded articles obtained by pressing artificial masses in the dry state.

Molded articles of the most varied shapes may be prepared according to the process of the present invention, for instance stoppers for bottles, coatings for instruments, boxes or tubes (for this purpose the molds are wrapped and the paste is painted thereupon). The process is suited above all for the manufacture of prosthetic work in dentistry. Also dentures either be repaired according to the present process of artificial masses or even of dental rubber can without difficulty.

The following examples illustrate the invention without, however, restricting it thereto, the parts being by weight:

*Example*

A paste consisting of

1

| | Parts |
|---|---|
| Benzylcellulose | 40 |
| Water | 46 |
| Ethanol | 5 |
| Glycerine | 2.5 |
| Titanium dioxide | 3.5 |
| Cadmium red | 0.35 | is introduced by means of a spatula into a mold of hard plaster. After setting-up the countercasting the filled mold is kept 25 minutes in boiling water. Then the mold is tightly closed and heated to 138° C. in an autoclave for half an hour in a vapor atmosphere.

Depending on the mold used, for instance dentures, boxes or cuffs for instruments can be manufactured according to the present process.

In a similar manner the following pastes can be worked up:

2

| | Parts |
|---|---|
| A mixture of benzylcellulose and polyvinyl chloride in the proportion 3:1 | 50 |
| Water | 40 |
| Ethanol | 4 |
| Glycerine | 2 |
| Red iron oxide | 3 |

3

| | Parts |
|---|---|
| Polyvinyl carbazole | 65 |
| Water | 30 |
| Ethanol | 3.5 |
| Glycerine | 1.8 |
| Cadmium red | 0.4 |

4

| | | |
|---|---|---|
| A mixed polymerizate of vinyl chloride and acrylic acid methyl ester | parts | 54 |
| Water | do | 40 |
| Ethanol | do | 4 |
| Glycerine | do | 2 |
| Titanium dioxide | per cent | 0.4 |
| An organic red pigment | do | 0.2 |

5

| | | |
|---|---|---|
| A mixture of benzyl cellulose with chlorinated rubber | parts | 40 |
| Water | do | 50 |
| Ethanol | do | 5 |
| Glycerine | do | 2.5 |
| Aluminium bronze | per cent | 3 |

The artificial masses cited had in all cases been ground to a fineness of 50 to 500μ before making them into a paste.

On adding traces of water acetyl cellulose has already been formed at 150° C. under a relatively high pressure. Nevertheless it could not be foreseen that when using aqueous pastes with a much higher water content an exact reproduction of the mold could nevertheless be obtained. This fact is of particular importance in the manufacture of dental prosthetic work in which an extremely exact adaption is required.

I claim:

1. A process of manufacturing molded articles from an artificial mass composed predominantly of a water-insoluble thermoplastic material which comprises the steps of preparing a paste of cement-like consistency containing such thermoplastic material and water, introducing a quantity of such paste into a mold, raising the temperature of the mold and its contents at least to the softening point of such thermoplastic material, adjusting the amount of paste so that the same completely fills said mold, closing the mold and then subjecting the closed mold and its contents to further heating at a temperature in the neighborhood of the softening point of said thermoplastic material.

2. A process of manufacturing molded articles as defined in claim 1 in which the paste is formed by subdividing the thermoplastic material to a particle size ranging from 50 to 500μ and incorporating therewith about 15–60% of water.

3. A process of manufacturing molded articles as defined in claim 1 in which any excess of water is removed from the paste prior to the heating of that paste in the closed mold.

4. A process of manufacturing molded articles as defined in claim 1 in which any excess of water is removed by absorption from the paste between heatings.

5. A process of manufacturing molded articles as defined in claim 1 in which the heating in the closed mold is carried out within an autoclave under predetermined vapor pressure and free from external mechanical pressure.

6. A process of manufacturing molded articles as defined in claim 1 in which the paste is composed of substantially the following ingredients in substantially the following proportions, by weight:

| | Parts |
|---|---|
| Benzylcellulose | 40 |
| Water | 46 |
| Ethanol | 5 |
| Glycerine | 2.5 |
| Titanium dioxide | 3.5 |
| Cadmium red | 0.35 |

7. A process of manufacturing molded articles as defined in claim 1 in which the paste is composed of substantially the following ingredients in substantially the following proportions, by weight:

| | Parts |
|---|---|
| A mixture of benzylcellulose and polyvinyl chloride in the proportion 3:1 | 50 |
| Water | 40 |
| Ethanol | 4 |
| Glycerine | 2 |
| Red iron oxide | 3 |

8. A process of manufacturing molded articles as defined in claim 1 in which the paste is composed of substantially the following ingredients in substantially the following proportions, by weight:

| | | |
|---|---|---|
| A mixture of benzylcellulose with chlorinated rubber | parts | 40 |
| Water | do | 50 |
| Ethanol | do | 5 |
| Glycerine | do | 2.5 |
| Aluminium bronze | per cent | 3 |

HANS POHLE.
PAUL WEIKART.